April 11, 1939. S. P. TSCHAPPAT 2,153,852
TUBING HEAD
Filed June 2, 1937 4 Sheets-Sheet 1

Inventor
SHERIDAN P. TSCHAPPAT
By Jack R. Ahley
Attorney

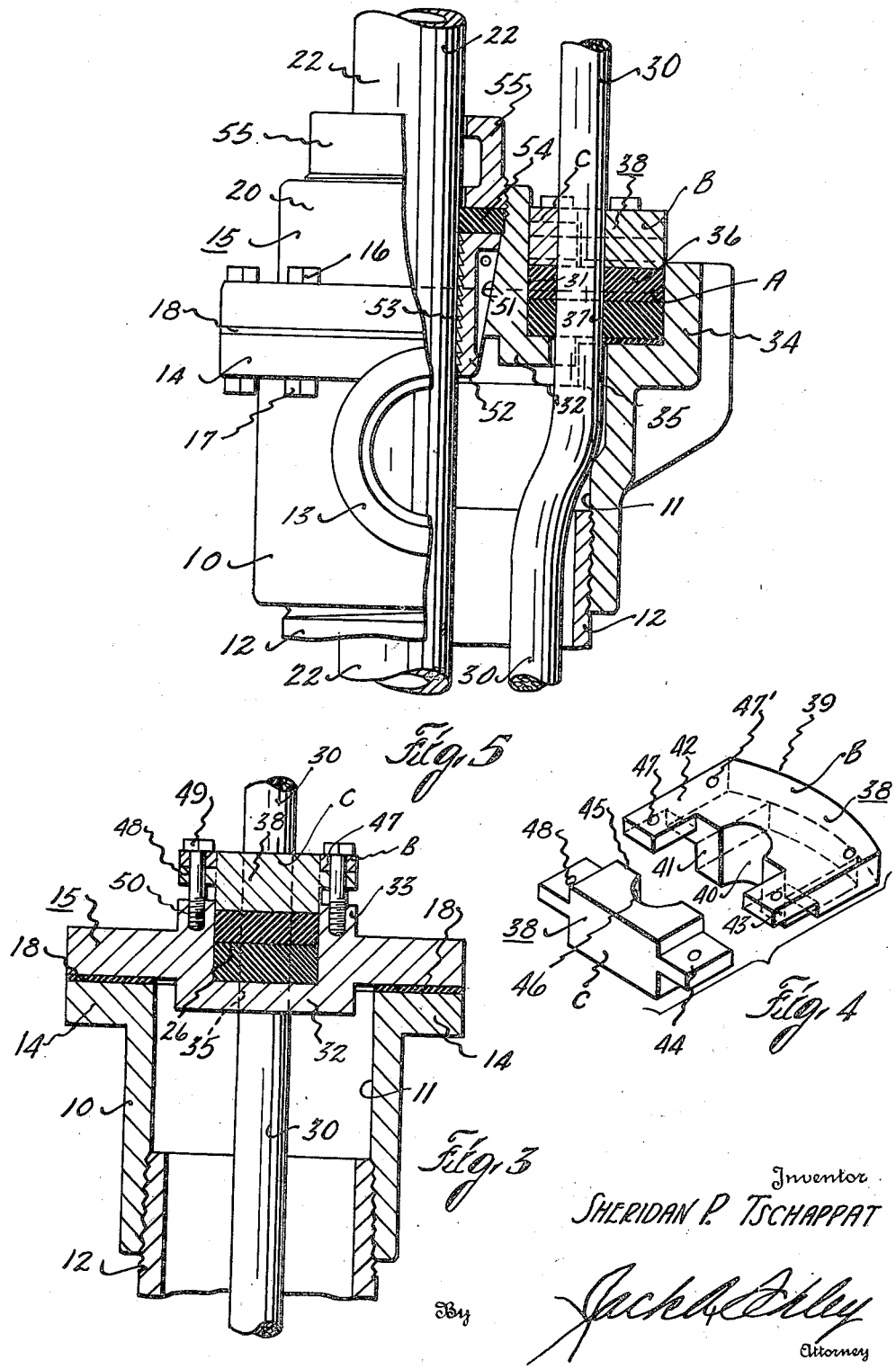

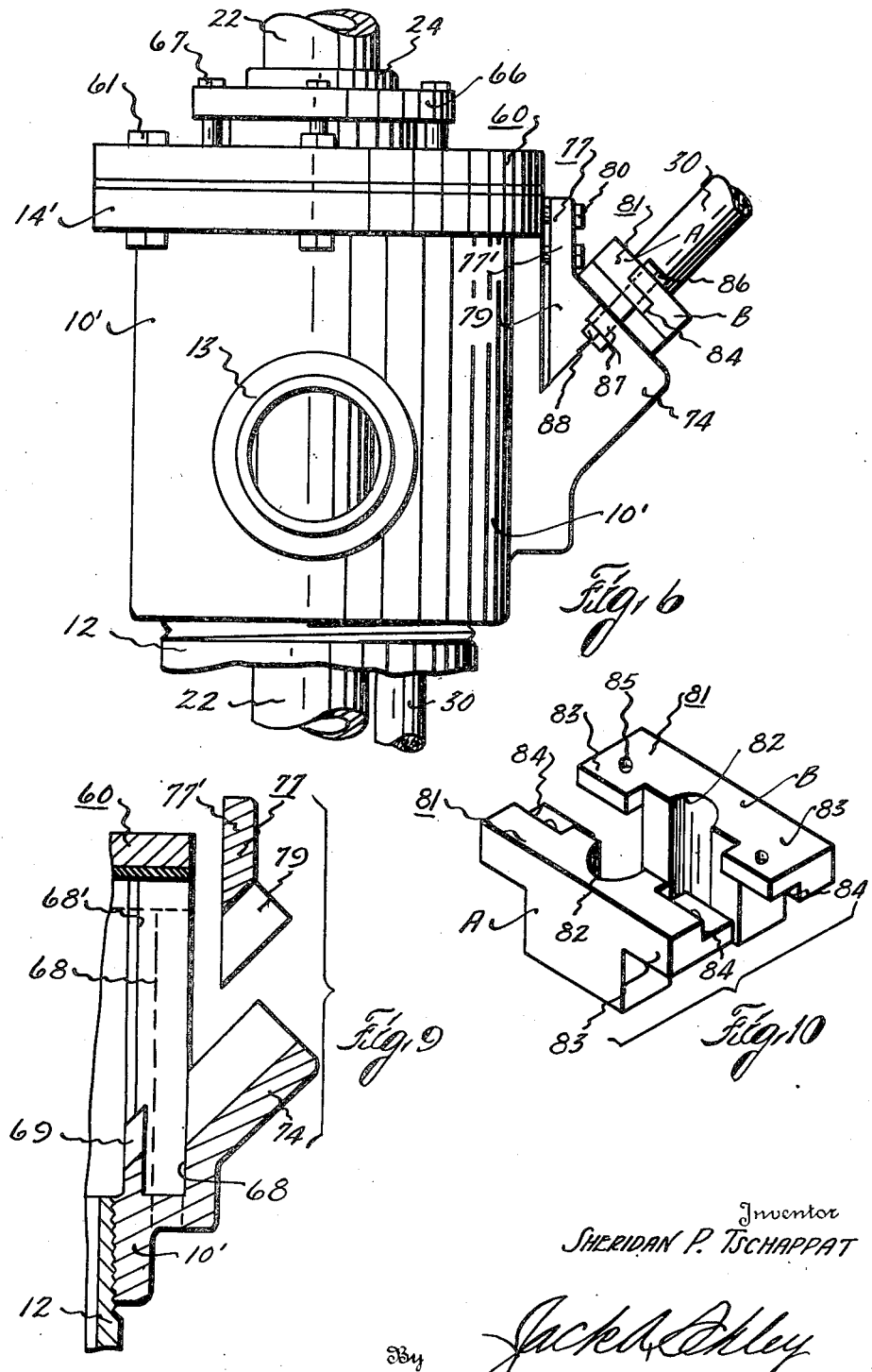

April 11, 1939.　　S. P. TSCHAPPAT　　2,153,852
TUBING HEAD
Filed June 2, 1937　　4 Sheets-Sheet 4
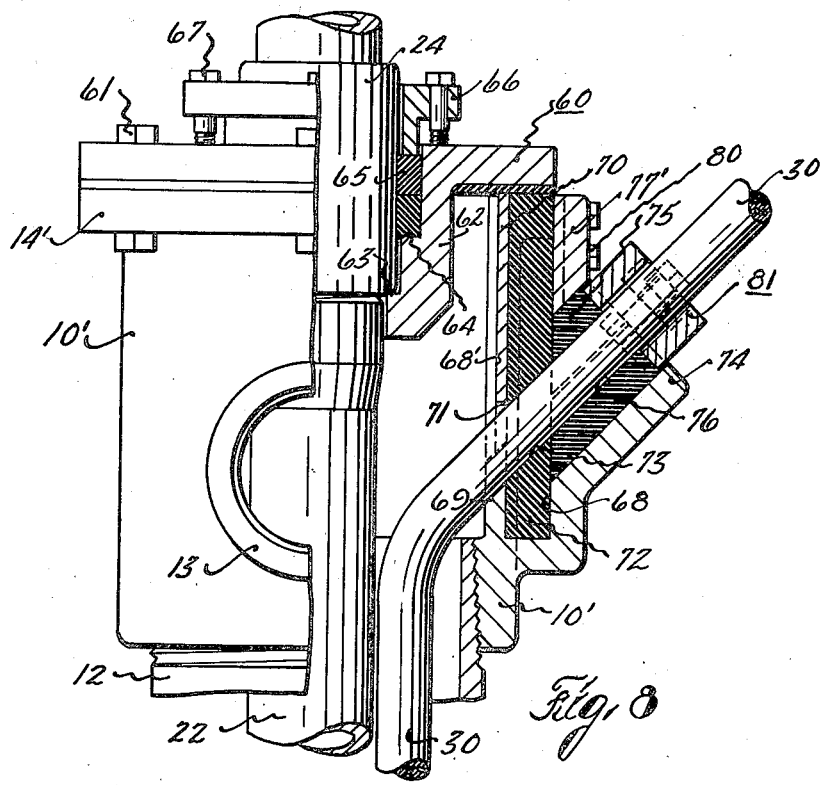
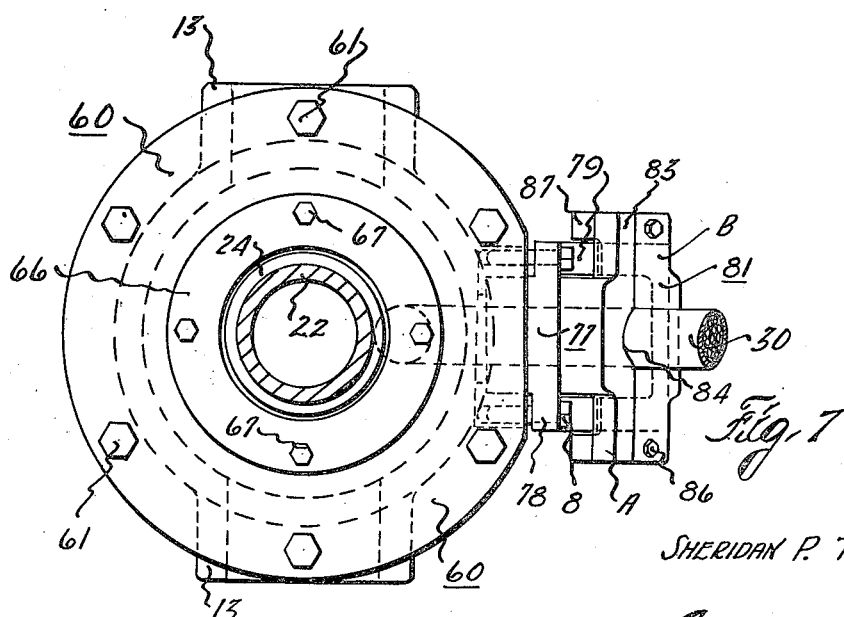
Inventor
SHERIDAN P. TSCHAPPAT
By Jack A. Ohly
Attorney Patented Apr. 11, 1939

2,153,852

UNITED STATES PATENT OFFICE 2,153,852

TUBING HEAD

Sheridan P. Tschappat, Tulsa, Okla.

Application June 2, 1937, Serial No. 146,027

9 Claims. (Cl. 166—14)

This invention relates to new and useful improvements in tubing heads.

One object of the invention is to provide an improved tubing head having means for supporting a tubing and means for packing off around the tubing, together with means for packing off a cable, small pipe or other member passing through the head outside of the tubing.

An important object of the invention is to provide an improved tubing head for supporting and packing off around a well tubing and being arranged so that an extraneous element may extend through the head outside of the tubing, with means for packing off around said extraneous element, said packing means being separate from the packing means of the tubing, whereby each does not interfere with the other and may be individually removed or replaced.

Another object of the invention is to provide an improved tubing head of the character described wherein means is provided for packing off around an auxiliary element, said means being entirely separate from the support for the tubing which is suspended from said head, whereby the normal function or operation of the tubing is not interfered with by the element or its packing means.

Still another object of the invention is to provide an improved tubing head wherein the tubing may be suspended axially therefrom with means in the side wall of the tubing head for packing off around a smaller element, such as a cable or pipe, whereby the upper end of the head is unobstructed.

A further object of the invention is to provide an improved packing means for packing off around an auxiliary element which extends through a tubing head outside of the well tubing.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view partly in elevation and partly in section of a tubing head, constructed in accordance with the invention, Figure 2 is a plan view, Figure 3 is a transverse, vertical, sectional view taken on the line 3—3 of Figure 2, Figure 4 is a perspective view showing the split packing gland for packing off around the extraneous element, Figure 5 is a view similar to Figure 1 showing a slightly modified form of the invention.

Figure 6 is an elevation of still another form of the invention,

Figure 7 is a plan view thereof,

Figure 8 is a view partially in elevation and partially in section of this form of the invention, Figure 9 is a partial transverse, vertical, sectional view of the housing, with the packing and cable removed, and Figure 10 is a perspective view showing the split packing gland for packing off around the element in this latter form of the invention.

Figures 1, 2:
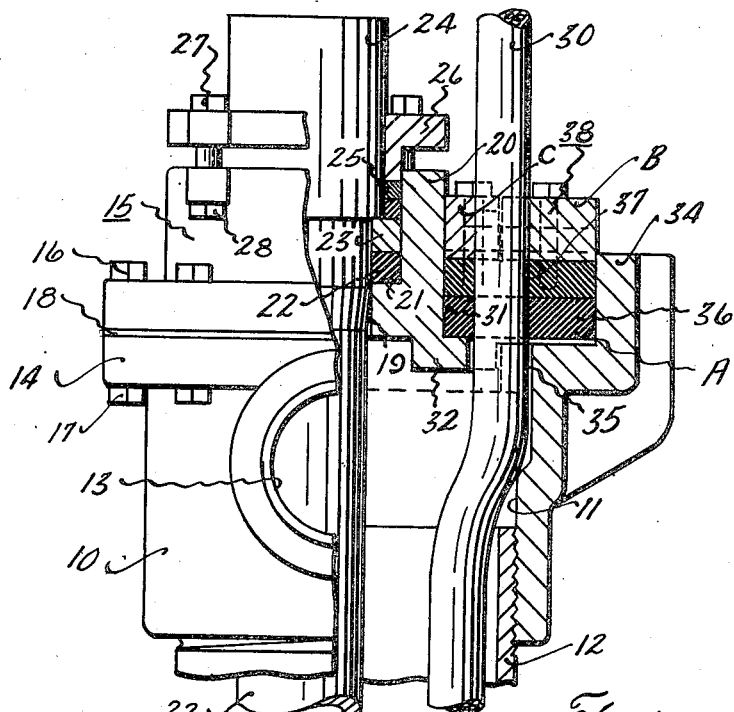

In the drawings, the numeral 10 designates a cylindrical body or housing having a bore 11. The lower end of the bore is internally screw-threaded so that the body may be mounted on the upper end of a well casing 12, or other support. The body is provided with the usual radial ports 13 which extend through the side walls thereof and which receive outlet pipe (not shown) for conducting the fluid from the casing 12. The upper end of the body is formed with an annular flange 14 and a flanged cap member 15 is arranged to be secured by bolts 16 and nuts 17 to said flange. A suitable packing gasket 18 may be interposed between the flanges.

The cap member 15 closes the upper end of the bore 11 of the body 10 and is provided with a circular opening 19, which opening is located off center or at one side of the cap member 15, as is clearly shown in Figure 2. A cylindrical collar 20 surrounds the opening 19 and its inner diameter is larger than the diameter of said opening, whereby an internal annular shoulder 21 is formed at the base of the collar 20. The well tubing 22 extends downwardly through the opening 19 and a packing ring 22', which rests on the internal shoulder 21, surrounds said tubing. A metallic supporting ring 23 rests on the packing ring 22' and a coupling collar 24 which is secured to the upper end of the tubing 22 rests on the inner marginal portion of the metallic ring 23, whereby the tubing is suspended through the opening 19. Manifestly, since the weight of the tubing is on the metallic ring 23 and packing ring 22', said packing ring is deformed into packing position in order to seal the annular space between the collar 20 and tubing 22. For further packing off this space, packing rings 25 surround the lower end of the coupling collar 24 and are located within the collar 20 of the cap member 15, resting on the metallic supporting ring 23. A suitable flanged packing gland 26 has its lower end engaging the rings 25 and bolts 27 extend through the flange of the gland and pass through ears 20' formed on the exterior surface of the collar 20. The bolts 27 receive nuts 28 on their lower ends and manifestly, by tightening said bolts, it is possible to force the packing gland 26 downwardly within the collar 20 to deform the packing rings 25 into sealing position.

As above set forth, the opening 19 in the cap member 15 is offset from the center of said cap and therefore is out of axial alinement with the bore 11 of the body. Therefore, the tubing 22 which is suspended within the bore of said tubing and within the bore of the well casing 12 is not disposed axially of said bore or said casing but is closer to one side thereof. Thus, a space is provided between the outer surface of the tubing and the wall of the casing and bore 11, whereby an electric cable, small pipe, or other extraneous element 30 may extend downwardly through the bore 11 of the body 10 and through the well casing 12. The cable or pipe is, of course, outside of the well tubing 22. The cable may be utilized where an electrically driven pump is located in the casing 12 below the head or if such a pump is not employed, the element 30 may take the form of a small pipe or other conductor.

Manifestly, since the cable extends upwardly through the head or body 10, as is shown in Figure 1, some means must be provided for packing off around said cable to prevent the escape of pressure therearound. Various types of stuffing boxes or other packing means may be employed but it is preferable to form a recess 31, in the upper surface of the cap member 15 at a point opposite the opening 19. The recess 31 extends from the exterior surface of the collar 20 to the outer peripheral portion of the cap member 15, as is clearly shown in Figure 2. In order that the recess 31 be of sufficient depth to accommodate a suitable packing, the under side of the cap member 15 may be offset as shown at 32 in Figures 1 and 3. This offset portion will, of course, take the same shape as the shape of the recess 31, which is substantially rectangular. On each side of the recess upwardly extending flanges 33 are provided while at the outer end of said recess a flange 34 (Figure 1) extends upwardly from the body 10, the inner side of this flange being curved so as to engage the outer periphery of the flange of the cap 15 when said cap is in position on the body. With the above arrangement, it will be obvious that the recess is surrounded on two sides by the flanges 33, on its outer end by the flange 34 and at its inner end by the exterior surface of the collar 20. The recess, of course, forms a box in one side of the cap member 15.

The offset portion 32 on the underside of the cap member 15 forms the bottom of the box and is provided with a cylindrical opening 35 through which the cable or element 30 extends. Packing blocks 36 are inserted in the box A and are provided with openings 37 through which the element 30 extends and it is pointed out that the openings 37 are of such diameter as to snugly engage the element passing therethrough. For retaining the blocks 36 within the box and also for deforming the same into sealing position, a split packing gland 38 is adapted to close the upper end of the box. This packing gland is clearly shown in Figure 4 and comprises two sections B and C. The section B is made in the form of a block which has its outer edge curved as shown at 39, which curve is complementary to the curve of the inner surface of the upwardly extending flange 34 on the body 10, whereby when the section B is placed in the upper end of the box on top of the packing member 36, this outer edge will engage the inner surface of the flange 34 and be confined thereby. A semi-circular recess 40 is formed centrally on the inner face 41 of the section B and side flanges 42, which are preferably made integral with the section B, overlie the upwardly extending side flanges 33 of the box A. The flanges 42 project beyond the inner face 41 of the block and are reduced in width. The projecting portions 43 of the flanges 42 are adapted to overlie flanges 44 which project outwardly from the section C, when the sections are in position within the box A. When the projecting portions 43 overlie said flanges 44, the inner face 45 of the section C contacts the inner face 41 of the section B and this inner face 45 is formed with a semi-circular recess 46 which is complementary to the recess 40, whereby when the sections B and C are engaging each other, the recesses 40 and 46 provide a circular opening through which the element 30 extends. The projecting portions 43 of the side flanges 42 on the section B are provided with openings 47 which register with openings 48 in the flanges 44 of the section C, whereby stud bolts 49 may extend through said openings and hold the sections together. The lower ends of the bolts 39 are threaded into openings 50 provided in the top of the side flanges 33 of the box A.

The outer ends of the flanges 42 of the section B are provided with additional openings 47', whereby additional bolts 49 may extend therethrough and fasten into the flanges 33 to more rigidly secure the gland in position within the box A.

From the above, it will be seen that the element 30, which may be an electric cable or small pipe, extends upwardly through the box A and is surrounded by the packing members 36 which are located within said box. It is pointed out that the packing members may, if desired, be split so that they may be engaged around the element and inserted within the box without removing the cable from its position extending downwardly through the casing. Since the gland 38 is split, it is possible to place said gland in the upper end of the box after the packing members 36 are properly positioned, around the element 30 extending upwardly through the box. The section C is first placed in position so that its semi-circular recess 46 in its inner face 45 engages the element 30. The section B is then inserted so that its lower end engages within the box and its outer surface engages the inner side of the upwardly extending flange 34 which places its semi-circular recess 40 around the element 30. This causes the inner face 41 of the section B to engage the inner face 45 of the section C and also places the projecting portions 43 of the side flanges of the section B over the outwardly extending flanges 44 of the section C, whereby the openings 47 and 48 in the flanges register with each other. The projection of the flanges 42 is substantially the same as the width of the flanges 44 whereby when the faces of the sections engage each other, the inner edge of the flanges 44 abuts the flanges 42 at the shoulder 42' formed between the projections 43 and the flanges 42, as is clearly shown in Figure 4. The bolts 49 are then inserted through the openings 47 and 48 and also through the openings 47' and are screwed into the upwardly extending flanges 33 of the box A.

Tightening of the bolts 49 will, of course, force the gland downwardly against the packing members 36 to deform the same into sealing position.

Since the cable or other element 30 is located at one side of the tubing head, it is evident that said cable or its packing means is entirely separate from the tubing support and from the packing means which surround said tubing. It is possible to remove the gland 38 and renew the packing members 36 without disturbing the tubing 22 and similarly, it is possible to repack around the tubing without disturbing the packing means or the element. Therefore, although the device is made in a unit there is, in effect, two separate packing means, one for the tubing and one for the element. This is particularly advantageous since the tubing may be run in or out of the well, repacked or otherwise manipulated without interfering with the pack-off around the element 30. Also the element may be repacked without disturbing the tubing.

In Figure 5, a slightly modified form of the invention is shown. In this form, an inclined bowl 51 is formed within the collar 20 of the cap member 15. This bowl receives gripping slips 52 which have the usual gripping teeth 53 on their inner periphery and these teeth are adapted to engage the exterior of the tubing 22 to support and suspend said tubing therefrom. A packing ring 54 rests on the upper end of the tubing and is confined within the upper end of the collar 20 and a suitable packing nut 55 is threaded into the upper end of said collar to force the packing ring 54 into sealing position. The arrangement of the cable or other element 30 and its packing means is exactly the same as in the first form. In this particular form of the invention, it is not necessary to support the tubing by a coupling collar such as 24 in Figure 1 but the tubing may be supported at any point along its surface by the engagement of the slips 52 therewith. Obviously, in this form the packing ring 54 may be replaced or the tubing may be removed without disturbing the packing around the element 30.

In Figures 6 to 10, a modified form of the invention is shown. In this form the cable or other element 30, instead of extending upwardly through the top of the device, is directed outwardly through one side thereof. The tubing 22 may be supported in any suitable manner axially within the body 10', however, it is preferable to support the same as is clearly shown in Figure 8. Such support includes a cover or cap member 60 which closes the upper end of the casing 10' and this cap is secured by bolts 61 to the flange 14' of the body. The cap is provided with a depending skirt 62 which is formed with an internal annular shoulder 63 near its lower end. The coupling collar 24 which is connected in the tubing-string 22 has its lower end resting on this shoulder 63, whereby the tubing is suspended therefrom. A second internal annular shoulder 64 is formed within the skirt 62 at a point above the shoulder 63, and suitable packing rings 65 rest on this shoulder. A suitable packing gland 66 engages the top of the uppermost packing ring and is secured to the cap 60 by bolts 67. Obviously by tightening the bolts, the gland 66 will distort the packing ring into sealing position.

The cable or element 30 which extends upwardly through the well casing in parallel relation to the well tubing 22 curves outwardly and extends through the wall of the body 10' at a point below the skirt 62, as is clearly shown in Figure 8. To permit the element to extent outwardly through the wall of the body, said body is formed with a vertically extending slot 68 which extends substantially throughout the vertical length of said body. The bottom of the slot is formed with a semi-circular recess 69 which receives the upwardly inclined element or cable 30. The slot 68 is reduced in transverse width near its inner end to provide a shoulder 68' therein. A plate 70 is inserted within the slot and abuts the shoulder 68', the lower end of said plate being provided with a semi-circular recess 71, whereby the plate engages over the cable or other element 30, as is clearly shown in Figure 8. After the plate 70 is positioned a vertically extending packing member 72 is positioned within the slot and has a depth substantially equal to the space between the plate 70 and the exterior surface of the housing 10'. This packing member is provided with an opening 73 through which the element 30 extends. It is noted that it would be possible to make this member split so that the same could be engaged around the element extending outwardly of the body 10'. After the member 72 is positioned, it will be seen that the outer surface thereof is substantially flush with the outer surface of the body.

The body 10' is formed with an upwardly inclined extension 74 which is preferably made integral with the body and which is substantially semi-circular in cross-section. An annular packing collar 75 is mounted within the extension 74 and has its inner end bevelled so as to abut the exterior surface of the lower portion of the packing member 72. This packing collar is provided with an axial opening 76 through which the element 30 extends, but it is obvious that it would be possible to make this collar split so that the same could be engaged around the element afer said element is extending from the body 10'.

For confining the packing member 72 and the packing collar 75, a retaining element 77 is provided. This element is clearly shown in Figures 6, 7 and 9 and includes a vertically extending plate 77' provided with vertical side flanges 78. A flared extension 79 depends from the plate of the element and is substantially semi-circular in cross-section, whereby when the plate 77' is placed against the upper portion of the packing member 72 (Figure 8), this extension will encircle the upper portion of the packing collar 75 and will have its lower end abutting the upper end of the semi-circular extension 74 which is formed on the body 10'. Bolts 80 pass through the vertical flanges 78 of the plate and securely fasten the retaining element to the body 10'. Manifestly, the extension 79 on the plate 77' together with the semi-circular extension 74 on the body 10', co-act to provide a collar within which the packing collar 75 is confined. As is clearly shown in Figure 8, the plate of the retaining element 77 not only retains the upper end of the packing member 72 in position, but the lower end of this plate is inclined to engage the wall of the collar 75 to prevent an upward displacement thereof. For moving the packing collar 75 into its sealing position, a split packing gland 81 is adapted to encircle the cable or element 30, with its lower end engaging the collar 75. The gland 81 includes sections A and B, each of which are provided with a semi-circular opening 82 through which the element 30 extends when the sections are placed together and inserted within the extensions 74 and 79. Each section is provided with outwardly directed flanges 83 which are provided with offsets 84 at their inner ends. When the sections are placed together the offset in the flanges cause the inner portions of said flanges to overlap and these overlapping portions have openings 86 therein. Bolts 86 pass through these openings and extend through ears 87 formed on the extension 74 of the housing 10'. Nuts 88 are threaded on the outer ends of the bolts 86 and obviously said bolts act not only to hold the sections A and B of the packing gland 81 together, but also serve to hold said gland in engagement with the packing collar 78.

With the above arrangement, it is obvious that the packing element 30 may extend outwardly through the side wall of the body 10', which permits the tubing 22 to be suspended axially within the body. Also the upper surface of the body is entirely unobstructed by the element, or its packing means being located therein. In this case, just as in the other two forms herein disclosed, the packing around the cable or element is entirely separate from the packing around the tubing 22 and therefore, either one may be removed or replaced without disturbing the other.

What I claim and desire to secure by Letters Patent is:

1. A well tubing head including, a housing, an internal shoulder within said housing for hanging a well tubing therefrom, means for packing off between the tubing and housing, a cable extending through the housing, and means separate from the tubing packing means for sealing off between the cable and housing.

2. A well tubing head including, a housing, an internal shoulder within said housing for hanging a well tubing vertically therein, means for packing off between the tubing and housing, a cable extending vertically through the housing and projecting from the upper end thereof, a packing chamber in the top of the housing and having said cable extending therethrough, elastic packing within the chamber surrounding the cable for sealing off between said cable and the housing, and a packing gland engaging said packing and secured to the housing for distorting the packing into sealing position, said gland being split whereby it may be placed around the cable while the same is extending through the housing and packing chamber.

3. A well tubing head including, a housing, means for hanging a well tubing vertically in said housing, means for packing off between the tubing and housing, the housing having a vertical slot in its side wall, a cable extending through said slot, a packing member through which the cable extends closing and sealing off said slot, a packing collar encircling the cable and abutting the packing member, a retaining element secured to the housing for confining the packing member and collar, and means for applying pressure to the packing collar for distorting the same into sealing position.

4. A well tubing head including, a cylindrical housing having means at its lower end for mounting on a well casing, a cap member fastened upon the upper end of the housing, a packing gland in the cap for packing off a tubing extending through the cap and housing, the cap having a recess at one side provided with an opening in its bottom for receiving a cable passing therethrough, a split packing mounted in the recess of said cap and also resting upon said housing, and a split gland member engaging in said cap recess and overhanging the housing for distorting said packing.

5. A well tubing head including, a cylindrical housing having an opening at one side, a packing having an opening for a cable passing therethrough and engaging in the opening of the housing to pack off the same around said cable, a cap mounted on said housing and confining said packing, a gland member distorting said packing, means carried by the cap for suspending a tubing, a packing element on the cap for packing off the tubing above the suspending means, and a gland member secured on the cap for distorting the packing element.

6. A well tubing head including, a cylindrical housing having means at its lower end for mounting on a well casing, a cap member fastened upon the upper end of the housing and provided with an opening and a recess directed inwardly from one side, means in the opening of the cap for suspending a well tubing from the cap, a packing in said opening of the cap for sealing around the tubing, and means for distorting the packing, the housing having a portion underlying the recess of the cap, a packing element engaging in the recess and resting upon the housing for packing off a cable extending through the housing and cap, a gland member fitting in the recess of the cap and overlying the packing, and means for fastening the gland member on the cap.

7. A well tubing head including, a cylindrical housing having means at its lower end for mounting on a well casing, a cap member fastened upon the upper end of the housing and provided with an opening and a recess directed inwardly from one side, means in the opening of the cap for suspending a well tubing from the cap, a packing in said opening of the cap for sealing around the tubing, and means for distorting the packing, the housing having a portion underlying the recess of the cap, a packing element engaging in the recess and resting upon the housing for packing off a cable extending through the housing and cap, a gland member including two parts adapted to engage around a cable and having overhanging portions forming a joint therebetween, and means passing through the joint of the gland member for fastening the same on the cap over the packing for distorting the latter.

8. A well tubing head including, a cylindrical housing having an upright opening at one side, an upright packing mounted in the opening of the housing and having an opening for the passage of a cable when the latter is directed outwardly from said housing, a closure mounted on the housing for confining the packing, a packing for packing off a cable extending through the first packing, a member for distorting the last named packing, and a cap mounted on the housing and having means for suspending and packing off a tubing.

9. A well tubing head including, a cylindrical housing having means at its lower end for mounting it on a well casing and provided with an upright opening at one side, a packing seat surrounding said opening, an upright packing engaging in the seat and covering said opening, an extension on the housing at the lower end of the opening, a packing collar in said extension engaging the upright packing for co-acting therewith in packing off a cable extending outwardly from the housing through the side opening thereof, and a cap mounted on the housing having means for suspending and packing off a tubing.

SHERIDAN P. TSCHAPPAT.